United States Patent [19]

Ekström et al.

[11] Patent Number: 4,818,635
[45] Date of Patent: Apr. 4, 1989

[54] NITRIDE-BASED CERAMIC MATERIAL

[75] Inventors: Thommy C. Ekström, Stockholm; Nils A. Ingelström, Bromma, both of Sweden

[73] Assignee: Santrade Ltd., Lucerne, Switzerland

[21] Appl. No.: 201,355

[22] Filed: May 27, 1988

Related U.S. Application Data

[63] Continuation of Ser. No. 21,627, Mar. 3, 1987, abandoned, which is a continuation of Ser. No. 719,141, Apr. 2, 1985, abandoned.

[30] Foreign Application Priority Data

Apr. 6, 1984 [SE] Sweden ................................ 8401921

[51] Int. Cl.$^4$ ............................................. C04B 35/58
[52] U.S. Cl. ..................................... 428/698; 501/92; 501/97; 501/98
[58] Field of Search ................ 428/698; 501/97, 98, 501/92

[56] References Cited

U.S. PATENT DOCUMENTS

| | | | |
|---|---|---|---|
| 4,113,503 | 9/1978 | Lumby et al. | 501/98 O R |
| 4,127,416 | 11/1978 | Lumby et al. | 501/154 X |
| 4,243,621 | 1/1981 | Mori et al. | 501/89 X |
| 4,424,066 | 1/1984 | Sarin et al. | 501/98 X |
| 4,426,209 | 1/1984 | Sarin et al. | 501/98 X |
| 4,506,020 | 3/1985 | Butler et al. | 501/97 OR |
| 4,543,345 | 9/1985 | Wei | 501/89 X |
| 4,547,470 | 10/1985 | Tanase et al. | 501/98 X |
| 4,563,433 | 1/1986 | Yeckley et al. | 501/97 OR |
| 4,711,644 | 12/1987 | Yeckley et al. | 501/98 X |

FOREIGN PATENT DOCUMENTS

| | | |
|---|---|---|
| 106817 | 4/1984 | European Pat. Off. |
| 1464022 | 2/1977 | United Kingdom |

OTHER PUBLICATIONS

"α'-Sialon Ceramics", Nature, vol. 274, No. 10, pp. 251-256.
Park H. K., Thompson D. P. & Jack K. H., "α'-Sialon Ceramics", Science of Ceramics, vol. 10.
Bhattacharyya S. K., Jawaid A., Lewis M. H. & Wallbank J., "Wear Mechanisms of Syalon Ceramic Tools When Machining Nickel-Based Materials", Metals Technology, Dec. 1983, vol. 10.

*Primary Examiner*—William R. Dixon, Jr.
*Assistant Examiner*—Karl Group
*Attorney, Agent, or Firm*—Burns, Doane, Swecker & Mathis

[57] ABSTRACT

The present invention relates to a sintered nitride-based ceramic material, where the presence of polytype of Si-Al-O-N together with beta' and/or alpha' Si-Al-O-N constitutes the main components. It also contains an intergranular phase and depending on the composition crystalline AlN or $Al_2O_3$. The properties of the material, such as the wear resistance and toughness behaviour, can be improved by adding hard refractory principles and/or fine whisker like fibers. Coating with hard, inert and wear resistant layers is another alternative. The material is suitable to use where the demands of resistance to thermal shocks, high mechanical strength or high heat conductivity are great. It has turned out to be especially suitable for cutting tools but also other applications are possible, e.g. as engine components, wear parts, heat exchangers or as substrate material in the electronic industry.

19 Claims, 1 Drawing Sheet

Fig 1

NITRIDE-BASED CERAMIC MATERIAL

This application is a continuation of application Ser. No. 021,627, filed Mar. 3, 1987, which, in turn, is a continuation of application Ser. No. 719,141, filed on Apr. 2, 1985, both now abandoned.

The present invention relates to a nitride-based ceramic material having extraordinary high-temperature properties, high resistance to thermal shock and excellent heat conductivity. The material is particularly suitable as cutting tool material. The invention has reference to a kind of a nitride ceramic of the Si-Al-O-N type, in which a finely dispersed precipitation of polytype has given positive effects on the properties of the ceramic material.

There are many articles and patents describing the Si-Al-O-N system (e.g. in the book "Progress in Nitrogen Ceramics" Ed. F.L. Riley, 1983, Martinus Nijhoff Publ.) and the phase relationship when certain oxides such as for example $Y_2O_3$ are added. A hexagonal phase with the general composition $Si_{6-z}Al_zO_zN_{8-z}$, where $0<z\leq 4.2$ is known as beta' Si-Al-O-N and this material has the same crystal structure as beta $Si_3N_4$. Another hexagonal phase has the general composition $M_x(Si,Al)_{12}(O,N)_{16}$, where $0<x<2$ and M=yttrium or other metals such as Li, Ca, Mg, and the lanthanides or mixtures of these metals. Other metals having a suitable ion radius may also stabilize the alpha' phase. It has the same principal structure as alpha $Si_3N_4$. It has been found difficult, however, to make La and Ce part of the alpha' Si-Al-O-N, because the ion radius seems somewhat too large.

Many phases in the Si-Al-O-N system or in the M-Si-Al-O-N systems have structures which can be described as a superstructure of wurzite-type in which AlN crystallizes. The letter M represents, as earlier, one or more metal e.g. Y, Mg, Be, Li or Sc. Other metals having a suitable ion radius may probably also be included. These phases are usually known as polytypes and they are present in the Si-Al-O-N system in the quadrant defined by high Al- and N-contents, i.e. close to the AlN-corner. In the following, the phase or the phases are generally given by the notation "polytype". The polytype structures are more or less well-ordered and can be referred to the mentioned wurzite basic structure (see e.g. the above mentioned book). The polytypes have either hexagonal or rhombohedral unit cells which are described by so called Ramsdell symbols as 8H, 15R, 12H, 21R, 27R and 2H. These polytypes are therefore often described in the literature according to these symbols e.g. 12H polytype material.

The basic phase analytical studies of Si-Al-O-N many of the M-Si-Al-O-N -systems have been performed already during the 1970-ies and there are a great number of publications as has been mentioned earlier. There are also several patents from the early seventies on the use of beta' Si-Al-O-N particularly by Toshiba (e.g. U.S. Pat. No. 3,969,125), Toyota (e.g. U.S. Pat. No. 3,903,230) and Lucas (e.g. U.S. Pat. No. 3,991,166). A first article about the formation of an alpha' Si-Al-On-N with Li was published already in 1972 and was then followed by many other. It was confirmed that the element yttrium, being of interest in cutting tool materials, formed said phase (S. Hampshire, H. K. Park, D. P. Thompson and K. H. Jack, Nature, vol 274 1978 p 880–882) and it was early pointed out that alpha' Si-Al-O-N could be of technological interest. It has been described by e.g. H. K. Park, D. P. Thompson and K. H. Jack in "Alpha'-sialon Ceramics", Science, Vol 10, 1980, p 251–256, H. Hausner (Ed) and further in the British patent application GB No. 2 118 927 A that materials of alpha' and beta' Si-Al-O-N could be obtained at certain compositions. The mentioned patent application relates to a ceramic cutting material of silicon aluminium oxynitride type with an alpha' phase of Si-Al-O-N and a beta' phase of Si-Al-O-N and a glass phase. The advantages, e.g. in cutting, which according to this invention surprisingly have been found to exist in Si-Al-On materials containing polytype has, however, not been seen reported or proposed earlier.

The Si-Al-O-N materials, which have been described above, can in certain cases be obtained by sintering—without pressure—of $Si_3N_4$ with a certain amount of silicon dioxide on the surface, $Al_2O_3$—usually a small amount—and small additions of metal oxides, nitrides or oxynitrides, such as oxides, nitrides or oxynitrides of Y, Ca, Mg, Be, the elements of the lanthanide series etc or mixtures thereof. Such additions act as sintering aids and form together with $SiO_2$ and/or $Al_2O_3$ an intergranular high-melting glass phase at the sintering temperature of the ceramic material. Also other similar compounds of glass-forming metals might be used as sintering aids. Typical examples are the metals Zr and Hf which can be added in the form of oxides, oxynitrides or nitrides and form high melting and strong glasses. In addition, metals that easily form nitrides at heating in nitrogen atmosphere, might be one of the components of a sintering aid e.g. Si, Mg, Cr. The amount of glass phase shall naturally be sufficient to permit the sintering of the ceramic starting materials. In order to make a ceramic material having for example optimum cutting properties, the amount of glass phase has to be small, however, but not so small that the toughness behaviour of the material will be lost.

It is also known that certain metals such as e.g. Ca, Mg, Fe, etc lower the softening temperature of the glass phase. In order to obtain a glass phase having optimum high-temperature properties the contents of such elements in the glass phase therefore have to be so small that the good properties of the Si-Al-O-N materials—particularly when used as a cutting tool material—do not get lost.

It can be stressed that the overall composition of the glass has a significant influence both on the densifying step of the ceramic material, as well as upon the properties of the sintered material. It is therefore important to carefully select the sintering aids (or mixtures thereof) considering the service conditions of the materials. Additions of Mg-compounds will, for instance, give a ceramic material which is more easily processed and which can be used in wear parts. However, the material will lack good high-temperature properties. For the latter task elements that give high-melting, high-strenth glasses, like Y, Zr and the lanthanides, have to be used. Finally, through the choice of sintering aids the formation of other crystalline phases can be manipulated in a desired direction, as the M-Si-Al-O-N phase systems do not look alike. A vast number of possibilities will arise if mixtures of different elements are used. For instance, the formation of alpha' Si-Al-O-N can be affected using elements like La and Ce in the sintering mixture.

Besides the glass phase, as mentioned, other intergranular phases can be formed in which metals from the sintering aids are present. In general these phases are silicates or aluminium silicates of e.g. yttrium or similar structures which also contain nitrogen e.g. YAG (Yttrium Aluminium Garnet), N-YAM or YAM (Yttrium Aluminium Melilite), b-phase (a distorted form of YAG) and phases having the same structure as apatite or wollastonite. Similar phases appear also in other systems than in the Y-Si-Al-O-N system e.g. in corresponding systems with C and Be. With other metals in the sintering aids other crystalline phases might appear, which have other types of crystal structures than mentioned above.

Such metal-rich phases of the sintering aids can be made to crystallize out of the glass phase in a greater amount by e.g. a subsequent heat treatment. By this measure the amount of glass phase can be radically reduced. It has been proposed in the literature that such a reduction of the amount of glass phase by crystallisation of phases like the metal akluminium garnets can be advantageous in material intended for high-temperature applications e.g. engine components. In the case of yttrium such garnets are YAG or b-phase. In Si-Al-O-N materials, intended for cutting tools this is, however, not always an advantage because the toughness behaviour of the material can be deteriorated.

Other properties of the glass phase e.g. the microhardness can also be altered by addition of oxides, oxynitrides or nitrides of rare earth metals or beryllium to the $Y_2O_3$ normally being used. This favours in particular the high-temperature properties of the ceramic material.

Materials based upon $Si_3N_4$ and Si-Al-O-N have during the last ten years obtained an increased attention in e.g. use as a cutting tool material for metal cutting. The Si-Al-O-N materials being on the market as a cutting tool material can be classified in two main types: beta' Si-Al-O-N materials and mixed alpha'+beta' Si-Al-O-N materials. The reason for the good cutting properties is considered to be the small heat expansion of the $Si_3N_4$ structures and the presence of a highly viscous glass phase giving rise to an excellent toughness behaviour. This fact in combination with a microstructure, which leads to a good high-temperature strength and hardness gives rise to very interesting properties in cutting applications.

It is also known that an addition of refractory hard principals such as e.g. titanium nitride or titanium carbide can increase the wear resistance and heat conductivity of Si-Al-O-N materials in which the sintered structure contains beta' Si-Al-O-N and an intergranular phase or beta'+alpha' Si-Al-O-N and an intergranular phase. Also additions of oxides such as $ZrO_2$ and $HfO_2$ are expected to have a positive effect on the properties of the material e.g. the toughness behaviour.

According to our technological testing of a broad selection of various materials, the beta' Si-Al-O-N materials show good cutting properties in certain cast iron applications and in cutting of certain heat resistant alloys. By using a mixed alpha'+beta' Si-Al-O-N material, however, a broader range of cast iron as well as heat resistant materials can be machined with good results.

We have found that in Si-Al-O-N materials having a higher content of nitrogen and/or aluminium the hardness at room temperature but particularly at higher temperature is increased without influencing the toughness behaviour in a negative direction. In this way a favourable influence on the resistance to plastic deformation is obtained. Thus, plastic deformation of the cutting edge occurs under circumstances when the edge is exposed to high temperatures i.e. at high cutting speed and large feed. The plastic deformation leads to formation of cracks of the cutting edge and when the cracks grow, cutting insert failures are obtained. This kind of crack formation has been described for a beta' Si-Al-O-N material in Metals Tech 10(1983) p 482–9 (Bhattacharyya et al "Wear Mechanisms of Syalon Ceramics Tools when Machining Nickel-based Materials").

According to the invention it has been found, quite surprisingly, that the cutting tool properties can be further improved if there is used a Si-Al-O-N material having such a composition and being so made that the structure contains a mixture of alpha' and/or beta' Si-Al-O-N phase and a finely dispersed phase of polytype. The volume fraction of polytype shall be more than 0.5% preferably more than 1%. Besides, another advantage seems to be that the cutting tool properties, such as for example the toughness behaviour, do not become markedly impaired if a small amount of further yttrium-rich phases e.g. b-phase are present.

Examinations of Si-Al-O-N material with polytype according to the invention have shown that said phase is enriched with elements such as e.g. magnesium. Small amounts of this element probably influence the formation of polytype and by accumulation of magnesium in the polytype the content of magnesium in the glass phase is decreased, which is favourable to the high temperature properties of a cutting tool material. It is to be expected that even other metals, unfavourable to the glass phase, such as e.g. calcium can also be dissolved in the polytypes, which leads to an improvement of the toughness behaviour at higher temperatures.

We have found—as has been earlier mentioned—that it is important that the amount of glass phase is correctly adjusted with respect to the application. A great amount of glass phase gives too soft a material having inferior properties in chipforming machining. The total amount of intergranular phase should be less than 20% by volume and if the amount of glass is great, preferably less than 15% by volume. On the other hand, if the amount of glass phase is too small at the sintering temperature, it will be difficult to sinter the material dense under atmospheric pressure. It is also important with a certain amount of glass phse in order to form the desired fibrous structure of alpha', beta' and polytype. Presence of rod-shaped or fiber-like crystals improves the strength and toughness behaviour of the material. The amount of glass phase at the sintering should be more than 2% by volume, of which a part can secondarily crystallize to other metal-rich phases in the intergranular phase. A part of the original glass phase can also be decreased by growth of the alpha' or the polytype materials during the sintering process of the material whereby the total amount of intergranular phase in the sintered material according to the invention can be decreased to the lowest 0.5% by volume. If an increased pressure is used at the sintering the amount of intergranular phase can be decreased to the lowest 0.1% by volume.

The composition of the glass phase influences the solution of aluminium and oxygen in the beta' Si-Al-O-N phase. It can be difficult to dense-sinter compositions with very low z-values (at atmospheric pressure). On the other hand materials with very high z-values are more easily sintered and additions of sintering aids such as $Y_2O_3$ can therefore be decreased. We have found, however, that materials containing the beta' phase with z-values greater than about 1.5–2 can obtain a certain deterioration of the toughness behaviour which may be important if the material is used in chipforming machining. The cause may be that the beta' phase expands at the dissolution of great amounts of aluminium and oxygen and that the chemical binding therefore is weakened. On the other hand, we have also noticed that the dissolution wear, influenced by chemical resistance decrease by higher aluminium substitution. Thus, in certain metal cutting applications one cannot exclude that a high z-value material would be preferred.

We have found that it is important that the total composition of the Si-Al-O-N material according to the invention falls in the correct part of the M-Si-Al-O-N phase diagrams, in which M as earlier is a metal such as e.g. yttrium. Compared to the composition of commercially available cutting tool materials of Si-Al-O-N the contents of nitrogen and/or aluminium are greater in the material according to the invention. The amounts of the elements Si, Al, O and N should preferably be chosen so that in equilibrium conditions the total composition falls in the nitrogen and aluminium rich area of the phase diagram being defined by the lines $Si_{6-z}Al_zO_zN_{8-z}$, i.e. the beta' Si-Al-O-N phase, and the lines being the binary phase diagrams $AlN-Al_2O_3$ and $AlN-Si_3N_4$. However, the beta' Si-Al-O-N phase field when adding other metal compounds as sintered aids, will move depending upon the amount of the added metal. By such a total composition and suitable manufacturing method, the desired microstructure and phase composition are obtained, including phases of polytype. In using Si-Al-O-N materials for chipforming machining in a material difficult to cut, such as heat resistant alloys we have found that the volume fraction of polytype should be more than 1% preferably more than 2%. Non-equilibrium or composite ceramics can be prepared with an overall composition outside of the phase area defined above, containing polytype together with $Al_2O_3$ or polytype together with $Al_2O_3$ and the beta' Si-Al-O-N phase. Also in this latter case the volume fraction of polytype should be more than 1%, preferably more than 2%. The amount of polytype shall, however, never be above 99% by volume.

In a mixed alpha'+beta' Si-Al-O-N material the high-temperature properties such as e.g. the resistance to plastic deformation can be improved by increasing the ratio of alpha' to beta'. In using a mixed alpha'+beta' Si-Al-O-N material as cutting tool material we have observed that the volume fraction of the alpha' phase should exceed 20% and the fraction of beta' phase be lower than 80% preferably at least 30% by volume of alpha' phase and at the most 70% by volume of beta' phase. This favours the cutting properties of the material in certain applications but in order to obtain the extraordinary cutting performances which have been observed in materials according to the invention a certain amount of polytype has to be present in the microstructure. The volume fraction of polytype should be at least 0.5% preferably at least 1%. Too great a volume fraction of polytype, however, impairs the cutting properties of the material in particular the wear resistance. The amount of polytype should be less than 70% in applications as cutting tool material, preferably less than 50%. The amount of the alpha' phase or the beta' phase shall never be above 99% by volume.

An addition of one or more refractory hard principals to Si-Al-O-N material according to the invention, in particular nitrides or oxynitrides such as e.g. TiN, ZrN or cubic AlON, gives a ceramic material with improved wear resistance. In addition, metal nitrides like TiN and ZrN also improve sinterability. Similar advantages in wear resistance are obtained by additions of other refractory hard principals of the transition elements from the groups IV–VI of the periodical system and elements such as aluminium, silicon or boron and their compounds with carbon, nitrogen and/or oxygen or mixtures thereof preferably titanium carbide, titanium nitride, silicon carbide, boron carbide and/or cubic AlON. The volume fraction of the added hard principles has to be at least 2%, preferably more than 5% but not more than 60% by volume.

Compositions prepared in the vicinity of the $Al_2O_3$—AlN joint in the phase diagram at low temperatures might contain polytype, AlN and $Al_2O_3$, whereas at higher temperatures the cubic AlON phase will form. Nevertheless, the presence of more than 1% by volume of polytype will improve the properties. At very high temperatures or by the addition of oxides, nitrides or oxynitrides as sintering aids, the formation of polytypes will also be found for compositions on the $Al_2O_3$—AlN joint.

The additions of hard refractory materials in a fibrous or whisker like form has also a very positive influence upon the toughness of the ceramic composite. Such fibers shall preferably consist of the refractory hard principles mentioned in the previous paragraph or mixtures thereof, especially fibers of SiC, TiN, $B_4C$ and TiC. In addition, fibers of $Al_2O_3$ and $Si_2N_2O$ can be used for this purpose. The fibers or whiskers shall have a diameter below 2 μm, preferably below 1 μm. The aspect ratio (length/diameter ratio) shall exceed 10 or preferably exceed 20 for fibers with a diameter below 1 μm. It is the presence of very fine whisker like crystals of high-strength materials which have the optimum effect. To have a positive effect the volume fraction of the fiber like material shall exceed 1% but be below 50%. The best results are normally obtained for the interval 5–30% by volume, but the limits can vary somewhat depending on the choice of fiber material, the diameters and the aspect ratios.

In summary, we have found that the amounts of the raw materials preferably shall be chosen in such a way that the sintered structure in a cutting tool material contains 0.5–70% by volume of a polytype of Si-Al-O-N in a matrix consisting of 20–99% by volume of an alpha' Si-Al-O-N and/or 5–80% by volume of a beta' Si-Al-O-N and/or an intergranular phase making 0.1–20% by volume and which partly can be crystalline and/or alumina. In general the matrix has a content of intergranular phase of normally at least 0.5% by volume and normally at the most 10% by volume, if the main part of the intergranular phase consists of glass phase and sintering without high pressure is used. The sintered structure usually contains at least 1% by volume or at the most 50% by volume of polytype of Si-Al-O-N. Furthermore, the matrix of a mixed alpha'+beta' phase preferably consists of at least 30% by volume of alpha' Si-Al-O-N and at the most 70% by volume of beta' Si-Al-O-N.

If the volume fraction of polytype exceeds a certain amount, the wear resistance is deteriorated when used as a cutting tool material. In said application this is not necessarily a limitation. Coating with thin wear-resistant layers can give a possibility of using polytype-rich materials also in cutting tool applications.

Thin wear-resistant layers on ceramics materials can be applied by PVD (Physical Vvapour Deposition) or CVD (Chemical Vapour Deposition). On Si-Al-O-N material according to the invention, layers of nitrides, oxynitrides or oxides of the transition elements in the groups IV, V, VI and/or of the element aluminium give a good bond between layer and substrate. Particularly in connection with the use of multiple layers borides, carbides, carbonitrides or oxycarbides of the mentioned elements can preferably be present (see GB No. 1 464 022). Furthermore, it may be mentioned that in a European patent application No. 83850211-0 (Sandvik) it has been disclosed that an intermediate layer of hard borides of the elements of the groups III–V or hard yttrium compounds is advantageous on Si-Al-O-N material. Said kind of layer has also been found beneficial to the material according to the invention.

Thin wear-resistant layers of the above mentioned kind are advantageous to use on Si-Al-O-N material according to the invention in cutting tool application or in applications where a wear resistant layer results in a further improvement for example as wear part material.

The mechanism of the favourable influence of the polytype upon the material properties is not quite clear at present, but we know that many phases with a crystal structure of wurzite type such as AlN or superstructures of said compound such as polytype phases have a small heat expansion and that the heat conductivity of said phases is greater than of phases based upon structures of $Si_3N_4$ type. Furthermore a precipitation of finely dispersed polytype material out of the glass may strengthen said material. Precipitation of polytype decreases the amount of glass and changes the composition of the remaining glass phase and by this means also the viscosity. Grains of polytype grow in a pronounced rod or fiber shaped form. All these circumstances can be of importance for the properties of the material such as the resistance to thermal shocks, the toughness, the hardness or the decreased tendency towards chemical reaction at high temperatures.

The material according to the invention being of Si-Al-O-N type containing polytype with a superstructure of wurzite type has therefore interesting properties in many applications because of the excellent high temperature properties and heat shock resistance. This group can include for example engine components and wear parts and also heat exchanger because of the good heat conductivity of the material.

Other properties of the material according to the invention, such as high electrical resistance in combination with low heat expansion and great heat conductivity are also important for such substrate material which are used in the electronic industry. Manufacture of more densely packed integrated circuits requires new materials having a combination of said properties.

We have found that sintered materials with beta' Si-Al-O-N phase have an acceptable thermal conductivity. This is also the case for a mixed alpha'+beta' Si-Al-O-N material. However, if the fraction of alpha' Si-Al-O-N phase is high the thermal conductivity will decrease. The presence of more than 30% of polytype in such sintered materials gives a material with extraordinary good properties in this respect, because of the excellent thermal conductivity of the polytypes. Therefore in such applications, as substrate materials or heat exchangers, the volume fraction of polytype should exceed 30% by volume preferably at least 40% by volume. The volume fraction of alpha' or beta' Si-Al-O-N should be at the most 70% preferably at the most 60%. If the material contains both the phases alpha'+beta' Si-Al-O-N the total volume fraction of said phases shall be at the most 70% by volume preferably at the most 60% by volume. The sintered structure can also contain an intergranular phase which can partly be crystalline, making 0.1–20% by volume and—if the glass phase fraction is great—preferably less than 15% by volume. The structure can also contain crystalline AlN which shall be less than 30% by volume, preferably less than 20% by volume. In such a ceramic material close to the AlN-corner of the phase diagram where the volume fraction of alpha' and beta' Si-Al-O-N is below 10% the volume fraction of crystalline AlN shall be less than 95% preferably less than 90% and the volume fraction of polytype shall be more than 5% preferably more than 10%. The fraction of intergranular phase shall be 0.1–20% by volume preferably less than 15% by volume if the glass phase is great. When high electrical resistivity is required, the fraction of intergranular phase shall normally be at the most 10% by volume if the glass phase part is great. A more easily sintered material is obtained if the volume part of crystalline AlN is smaller than 80% and the amount of polytype is more than 20% by volume. The amount of oxide, nitride or oxynitride or aluminium—being present as a crystalline phase—shall, however, never be above 99% by volume.

The Si-Al-O-N polytype phases form in combination with the SiC phases, ceramic composite materials with extraordinary properties because of the great structural similarity and compatibility between these phases. Ceramic composites of SiC and polyphases of Si-A-O-N can be prepared at high temperatures and/or high pressures, dependent of overall composition and sintering aids.

These composites are characterised by a high thermal conductivity in combination with mechanical strength and chemical inertness. Thus, applications as heat exchangers or certain engine parts are obvious. However, the electrical resistance is low which disables the use as electronic substrate plates where this is of importance. On the other hand, being able to conduct electricity enables a much simpler and cheaper method of spark cutting of the ceramic. This is also the case when the addition of refractory hard principles such as TiN, TaN etc improves the electrical conductivity of the ceramic material.

Ceramic materials or composites prepared of SiC and the Si-Al-O-N polytypes have the desired properties if the volume fraction of polytype is greater than 1% preferably greater than 2%. The amount of SiC must exceed 5% by volume, preferably be more than 10% by volume. The fraction of other intergranular phases must be kept below 15 vol% if the major part is crystalline and preferably below 5% if the glass fraction is great. The presence of lower heat conducting phases as alpha' and beta' shall together be less than 15 vol % preferably less than 10 vol%. The presence of up to 95 vol%, preferably not more than 90 vol% of crystalline AlN has no deteriorating effect upon the composite properties.

In order to obtain compositions closer to the AlN-corner in the $Si_3N_4$-$SiO_2$-$Al_2O_3$-AlN phase diagram or to favour the formation of a certain polytype structure or polytype mixture in the sintered material according to the invention, AlN has preferably been used as a raw material. In the literature it has earlier been described that a specially produced material of polyphase e.g. 21R, can be used as raw material see e.g. U.S. Pat. No. 4,113,503 (Lucas Industries Ltd) and the British patent application GB No. 2 118 927 (Kennametal Inc). Certain limited compositions within the present patent application can be obtained from raw materials of for example 21R, but AlN is strongly recommended for the earlier mentioned reasons. Use of AlN necessitates, however, that a waterfree milling system is used which raises certain demands on lubricants and granulation methods. In order to reach all compositions within the invention there is also a demand for a more consistent composition of the dried powder with respect to for instance to the added amount of aluminium oxide (if milling bodies of aluminium oxide are used in the mill) and the amount of silicon dioxide being on the surface of the silicon nitride. It is obvious that there are advantages in using milling means of AlN. By addition of the used raw materials such as $Si_3N_4$ and AlN the oxide necessary for the material can consist of oxide impurities in the nitrides.

From the preceding text it is evident how the various Si-Al-O-N materials shall look like in order to give the desired properties. In Table 1 there are given some examples of compositions illustrating various properties mentioned in the text. The manufacturing procedure has been such that the different raw materials have been milled together with lubricants. If a ball mill is used a milling time of 1-3 days is needed. After that the material was dried and granulated to a powder having good flow properties, which is important for the following pressing to the desired shape. Sintering has been done in nitrogen-rich atmosphere in such a way that the tendency of the silicon nitride towards decomposition has been counteracted as much as possible. The temperature has been between 1700°-1860° C. depending partly upon the used pressure in the furnace.

In Table 1 below examples are given of Si-Al-O-N material produced.

TABLE 1

| | Amounts weighed-in normalised to 1000 g total. | | | | | |
|---|---|---|---|---|---|---|
| Material | $Si_3N_4$ | $Al_2O_3$ | AlN | Polyphase | $Y_2O_3$ | Note |
| 1 | 874 | 63 | — | — | 63 | |
| 2 | 457 | 172 | 308 | — | 63 | |
| 3 | 812 | 25 | 102 | — | 61 | |
| 4 | 847 | 23 | 69 | — | 61 | |
| 5 | 834 | 7 | — | 98 | 61 | |
| 6 | 843 | 37 | 59 | — | 61 | |
| 7 | 750 | 145 | 43 | — | 62 | |
| 8 | 422 | 375 | 141 | — | 62 | |
| 9 | 862 | 72 | 3 | — | 63 | |
| 10 | 832 | 45 | 97 | — | 26 | |
| 11 | — | 50 | 950 | — | — | |
| 12 | — | — | 910 | — | — | $SiO_2$, 5% |
| 13 | — | 40 | 860 | — | 50 | $SiO_2$, 5% |
| 14 | 812 | 25 | 102 | — | — | $ZrO_2$, 6% |
| 15 | 822 | 59 | — | — | 59 | $ZrO_2$, 6% |
| 16 | 763 | 24 | 96 | — | 57 | $ZrO_2$, 6% |
| 17 | 884 | — | — | — | 56 | $ZrO_2$, 6% |
| 18 | 622 | 24 | 279 | — | 60 | |
| 19 | 456 | 241 | 228 | — | 60 | |
| 20 | 301 | 201 | 423 | — | 60 | |
| 21 | 246 | 106 | 573 | — | 60 | |
| 22 | 370 | 450 | — | — | 30 | TiN, 15% |
| 23 | 570 | 250 | — | — | 30 | TiN, 15% |
| 24 | 635 | 25 | 10 | — | 30 | TiN, 30% |
| 25 | 683 | 77 | — | 60 | 30 | TiN, 15% |
| 26 | 775 | 45 | — | — | 30 | TiN, 15% |
| 27 | 569 | 18 | 71 | — | 43 | TiN, 30% |
| 28 | 780 | 50 | 95 | — | 60 | |
| 29 | 764 | 60 | — | 113 | 63 | |
| 30 | 192 | 15 | 587 | — | 5 | |
| 31 | 292 | 159 | 544 | — | 5 | |

The polyphase raw material used has been synthesised in such a way that the composition was about 20% $Al_2O_3$, 58% AlN, 20% $Si_3N_4$ resp. The rest constitutes impurities such as e.g. Fe, C etc.

The materials obtained can be characterised in the following way:

TABLE 2

| | Hardness measured according to the Vickers method with a load of one kilogram (HV1), z-value and amount of phases present | | | | |
|---|---|---|---|---|---|
| Material | Hardness | z-value | Beta' phase | Alpha' phase | Other phases |
| 1 | 1450 | 0.25 | 100% | — | — |
| 2 | 1500 | 1.8 | 60% | — | polytype 15R 40% |
| 3 | 1800 | 0.67 | 57% | 38% | polytype 12H 5% |
| 4 | 1720 | 0.57 | 73% | 27% | — |
| 5 | 1630 | 0.50 | 85% | 13% | b-phase 2% |
| 6 | 1600 | 0.53 | 88% | 10% | b-phase 2% |
| 7 | 1480 | 1.3 | 100% | — | — |
| 8 | 1450 | 2.7 | 96% | 2% | polytype 15R 2% |
| 9 | 1540 | 0.2 | 97% | — | YAG 3% |
| 10 | 1590 | 0.84 | 78% | 20% | polytype 12H 2% |
| 11 | — | — | — | — | AlN 85%, 2H 15% |
| 12 | — | — | — | — | 2H 70%, AlN 27%, unid 3% |
| 13 | — | — | — | — | 2H 60%, AlN 15%, YAG 20% unid 5% |
| 14 | 1600 | 0.9 | 75% | — | ZrO 15%, $ZrO_2$ 7%, 12H 3% |
| 15 | — | 0.31 | 75% | — | $ZrO_2$ 15%, ZrO 10% |
| 16 | — | 0.66 | 65% | — | ZrO 30%, YAG 3%,12H 2% |
| 17 | — | — | 80% | — | $ZrO_2$ 15%, ZrO 5% |
| 18 | — | 0.45 | 15% | 51% | 12H 13%, b-phase 10% AlN 9%,unid 2% |
| 19 | — | 1.80 | 57% | — | 15R 43% |
| 20 | — | 2.0 | 7% | — | 15R 93% |
| 21 | — | — | — | — | 2H 60%, unid 40% |
| 22 | 1430 | 1.8 | 79% | — | X-phase 5%, TiN 15% $Al_2O_3$ 1% |
| 23 | 1300 | 0.9 | 80% | — | X-phase 5%, TiN 15% |
| 24 | 1450 | 0.1 | 85% | — | TiN 15% |
| 25 | 1400 | 0.2 | 85% | — | TiN 15% |
| 26 | 1320 | 0.2 | 85% | — | TiN 15% |

TABLE 2-continued

Hardness measured according to the Vickers method with a load of one kilogram (HV1), z-value and amount of phases present

| Material | Hardness | z-value | Beta' phase | Alpha' phase | Other phases |
|---|---|---|---|---|---|
| 27 | 1740 | 0.77 | 53% | 15% | TiN 30%, YAM 1%, Polytype 1% |
| 28 | 1700 | 0.73 | 76% | 20% | 12H 4% |
| 29 | 1630 | 0.72 | 93% | — | 12H 4%, b-fas 3% |
| 30 | — | — | 1% | 20% | 21R 10%, 27R 10%, AlN 7%, 2H 52% |
| 31 | — | — | 1% | 15% | AlN 7%, 21R 76%, AlON 1% |

Tthe various materials contain between 0 and 20% glass phase which can not be detected by X-ray diffraction.

Figure 1:
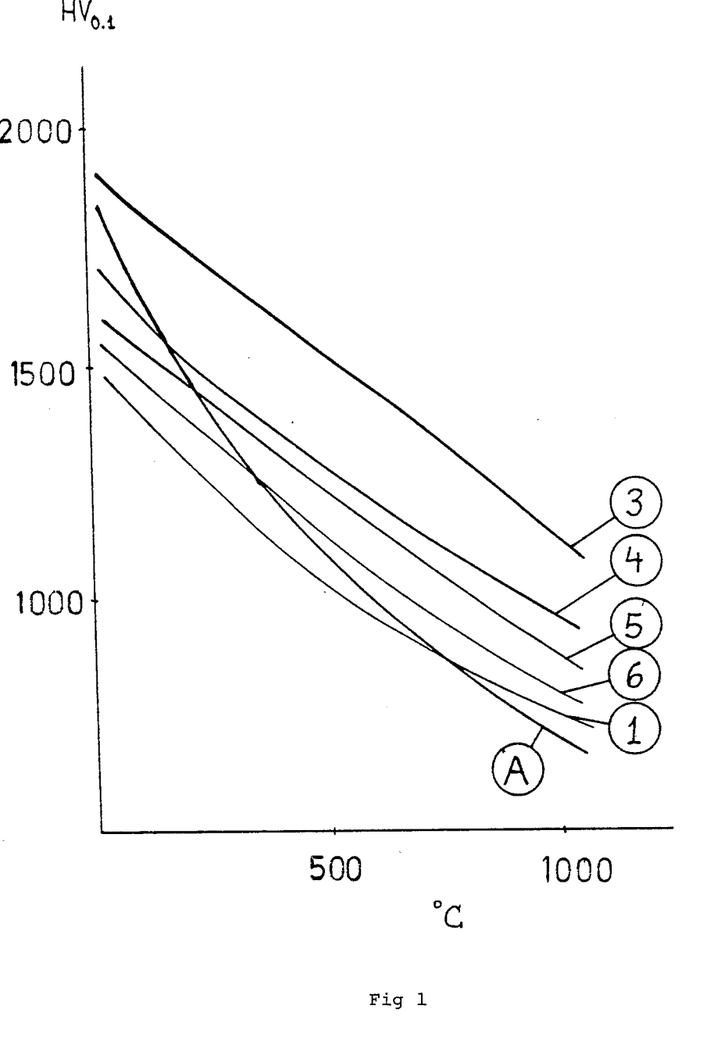

In order that the materials shall work as good cutting materials it is importat that the hardness is retained at higher temperatures. How the hardness (HV0.1) varies with the temperature is evident from FIG. 1 for some of the tested materials. A conventional cutting ceramics based on $Al_2O_3$ has been shown for comparison purposes, designated A.

In the following some examples are given for machining of heat resistant materials Examples 1-10 and of cast iron, Examples 11-19, where materials according to the invention are compared to known alloys.

MACHINING OF HEAT RESISTANT ALLOYS

EXAMPLE 1

Inserts of type SsNGN 120412E were used for the machining of "Incoloy 901" with the following cutting data:
Cutting speed: 150 and 310 m/min
Feed: 0.15 mm/rev
Depth of cut: 2.0 mm
Result:

| Material | Relative tool life | Relative flank wear rate | Relative notch wear rate |
|---|---|---|---|
| 3 | 125% | 80% | 105% |
| 4 | 100% | 100% | 155% |
| 5 | 100% | 100% | 100% |
| 6 | 75% | 100% | 100% |

EXAMPLE 2

At another test "Incoloy 901" was machined with the following cutting data:
Cutting speed: 310 m/min
Feed: 0.14 mm/rev
Depth of cut: 2.0 mm
Result:

| Material | Flank wear rate, mm/min | Notch wear rate, mm/min |
|---|---|---|
| 3 | 0.32 | 0.32 |
| 4 | 0.35 | 0.44 |

EXAMPLE 3 at a turning test "Incoloy 713C" (low carbon) was machined with insert of type CNGN 120812E with the following cutting data:
Cutting speed: 183 m/min
Feed: 0.15 mm/rev After a maching time of 96 s the flank wear was measured i mm.
Result:

| Material | Flank wear, mm |
|---|---|
| 3 | 1.0 |
| 4 | 1.4 |
| 1 | large flakings after short time |

EXAMPLE 4

At a test the following data were used in the same material as in Example 3 and with a machining time of 78 s:
Cutting speed: 213 m/min
Feed: 0.12 mm/rev
Result:

| Material | Flank wear, mm |
|---|---|
| 3 | 1.0 |
| 4 | 1.4 |

EXAMPLE 5

At a drilling operation in the material "René41" inserts of type RNGN 120800 e were used with the following cutting data:
Cutting speed: 259 m/min
Feed: 0.2 mm/rev
The wear life of material 3 was estimated to 47 s and of material 4 to 36 s.

EXAMPLE 6

At a drilling operation in the material "Waspaloy" inserts of type RNGN 120800E and the data below were used:
Cutting speed: 225–260 m/min
Feed: 0.15 mm/rev
After a total machining time of 33 s flakings were noted both in material 3 and 4. In material 1 a catastrophic fracture took place after only a few seconds.

EXAMPLE 7

At machining of a ring in the material "Hastealloy X" (heattreated) inserts of type RNGN 120800E the following data were used:
Cutting speed: 282 m/min
Feed: 0.175 mm/min
Depth of Cut: 2.5 mm
The wear life of material 3 was about 10% higher than of material 4 due to a lower flank wear. Materil 1 gave very short tool life, only a few seconds.

EXAMPLE 8

At machining of "Inconel 718" (solution heat treated) with inserts of type SNGN 120416T it was found that notch wear was determining for the wear life.
Cutting speed: 70–130–180–220 m/min
Feed: 0.20 mm/rev
Depth of cut: 2.0 mm
Result:

| Material | Notch wear rate, mm/min | | | |
|---|---|---|---|---|
| | 70 m/min | 130 m/min | 180 m/min | 220 m/min |
| 1 | 0.4 | 0.5 | 0.7 | 0.8 |
| 3 | 0.3 | 0.4 | 0.6 | 0.6 |
| 4 | 0.3 | 0.5 | 0.7 | 0.8 |

EXAMPLE 9

At machining a bar of "Inconel 718" with inserts of type SNGN 120416T (chamfer: 0.2°×10°) the following data were used:
Cutting speed: 180 m/min
Feed: 0.25 mm/rev
Depth of cut: 2.0 mm
Flood coolant was used.
Result:

| Material | Edge life % | Flank wear rate % | Notch wear rate % |
|---|---|---|---|
| 1 | 93 | 122 | 86 |
| 3 | 100 | 100 | 100 |
| 29 | 117 | 103 | 74 |

EXAMPLE 10

At machining bars of "Incoloy 901" with inserts of type SNGN 120416t with chamfer: 0.2°×20° the following data were used:
Cutting speed: 310 m/min
Feed: 0.15 mm/rev
Depth of cut: 2.0 mm
An approach angle of 45° and flood coolant were used.
Result:

| Material | Edge life % | Flank wear rate % | Notch wear rate % |
|---|---|---|---|
| 1 | 6 | — | — |
| 3 | 100 | 100 | 100 |
| 29 | 89 | 125 | 106 |

Material 1 exhibited great rake face flaking.

MACHINING OF CAST IRON

EXAMPLE 11

Inserts of type SNGN 120416E have been tested in grey cast iron with the following cutting data:
Cutting speed: 300 m/min
Feed: 0.15 mm/rev
Depth of cut: 2.0 mm
Result:

| Material | Relative mean wear life, % | Note |
|---|---|---|
| 3 | 113 | |
| 4 | 102 | |
| 6 | 77 | |
| 1 | 100 | datum |

EXAMPLE 12

The results below were obtained in a similar operation with cutting data below:
Cutting speed: 300 m/min
Feed: 0.50 mm/rev
Depth of cut: 3.0 mm
Result:

| Material | Relative mean wear life, % | Note |
|---|---|---|
| 9 | 49 | |
| 2 | 113 | |
| 1 | 100 | datum |

EXAMPLE 13

At a test with continuous length turning in grey cast iron the flank wear rate was measured at different cutting speeds:
Cutting speed: 300–600–800 m/min
Feed: 0.3 mm/rev
Depth of cut: 2.0 mm
Result:

| Material | Flank wear rate in mm/min at a cutting speed of m/min | | |
|---|---|---|---|
| | 400 | 600 | 800 |
| 3 | 0.011 | 0.012 | 0.10 |
| 4 | 0.013 | 0.014 | 0.12 |
| 1 | 0.013 | 0.015 | 0.13 |

EXAMPLE 14

At another test brake drums in grey cast iron were rough turned with the following cutting data:
Cutting speed: 750 m/min
Feed: 0.3 mm/rev
Depth of cut: 2–3 mm
Result:

| Material | Wear life, min |
|---|---|
| 1 | 3.3 |
| 3 | 10 |

EXAMPLE 15

At a test with intermittent machining of cast iron inserts of type SsNGN 120416T with a chamber 0.20°×20° were used at a plaining operation:
Cutting speed: 300 m/min
Feed: 0.5 mm/rev
Depth of cut: 3.0 mm
Materials 1 and 4 obtained the same wear life whereas material 3 obtained about 20% longer wear life. The criteria for the wear life was insert fracture.

EXAMPLE 16

At a test with machining of nodular iron (SS0737) the following cutting data were used with inserts of type SNGN 120416T:
Cutting speed: 400-600-800 m/min
Feed: 0.3 mm/rev
Depth of cut: 2.0 mm
Result:

| | Wear life (number of passes before insert fracture) | | |
|---|---|---|---|
| Material | 400 m/min | 600 m/min | 800 m/min |
| 1 | 15 | 15 | 15 |
| 3 | 15 | 15 | 15 |
| 4 | 14 | 15 | 15 |

Note: The test was interrupted after 15 passes which corresponds to a very good toughness behaviour. A conventional $Al_2O_3$-based ceramic manages only a few passes.

EXAMPLE 17

At intermittent maching of grey cast iron with inserts type SNGN 120416T with a chamfer 0.20°×20° in a planing operation the following data were used:
Cutting speed: 300 m/min
Feed: 0.20 mm/rev
Depth of cut: 2.0 mm
Result:

| Material | Mean edge life (flank wear <0.5 mm) | Relative edge fracture resistance*, % |
|---|---|---|
| 1 | 4 min | 100 |
| 22 | 35 min | 7 |
| 23 | 25 min | 7 |
| 26 | — | 70 |

*in intermittent cutting

EXAMPLE 18

At machining of grey cast iron with material 1 uncoated and coated with 1.5 μm $Al_2O_3$ (1A) or 1.5 μm TiN+1.5 μm $Al_2O_3$ (1B) the following data were used:
Cutting speed: 200-300-400 m/min
Feed: 0.30 mm/rev
Depth of cut: 2.0 mm
Result:

| | Flank wear rate (mm/min) | | |
|---|---|---|---|
| Material | 200 m/min | 300 m/min | 400 m/min |
| 1 | 0.03 | 0.05 | 0.14 |
| 1A | 0.01 | 0.03 | 0.04 |
| 1B | 0.01 | 0.03 | 0.06 |

EXAMPLE 19

At machining of grey cast iron with material 3 uncoated and coated with 1.5 μm $Al_2O_3$ the following data were used:
Cutting speed: 400-800 m/min
Feed: 0.30 mm/rev
Depth of cut: 2.0 mm
Result:

| | Flank wear rate, mm/min | |
|---|---|---|
| Material | 400 m/min | 800 m/min |
| 3 | 0.016 | 0.054 |
| 3A | 0.012 | 0.035 |

From the examples above it is evident that materials containing polytype exhibit improved wear characteristics compared to Si-Al-O-N materials without polytype. For example, materials 3 and 29 have shown excellent results when machining heat resistant alloys. In addition, an increased wear resistance has been observed by the addition of hard principals or by applying a refractory coating.

DEFINITION OF PHASES

In the above description and in the claims below the following phases appear which are part of materials according to the invention:

1. Beta' Si-Al-O-N is a hexagonal phase with the same crystal structure as beta $Si_3N_4$. It can be described by the general formula $Si_{6-z}Al_zO_zN_{8-z}$ where $0<z<4.2$. The phase appears in the material in question in a crystalline form, which can be detected by its characteristic X-ray diffraction pattern.

2. Alpha' Si-Al-O-N is a hexagonal phase with the same crystal structure as alpha $Si_3N_4$. It can be described with the general formula $M_x(Si,Al)_{12}(O,N)_{16}$ where $0<x<2$. The metal M can be Y, Li, Ca, Mg and elements from the lanthanide series or mixtures of these metals. Other metals having a suitable ion radius may also stabilize the alpha' phase. The phases can be detected by X-ray diffraction.

3. Alpha $Si_3N_4$ and beta $Si_3N_4$ are two unsubstituted forms of $Si_3N_4$. Also crystalline AlN is unsubstituted with a structure of wurzite type.

4. Polytypes is a collective name of a number of phases in the Si-Al-O-N or in the M-Si-Al-O-N systems with crystal structures which are closely related to the wurzite structure characteristic of AlN, but which have considerably greater unit cells. The metal M can be Y, Li, Ca, Mg, Be, Sc and elements from the lanthanide series or mixtures of these metals. However, other elements with a similar size and structural behviour might also, more or less, enter into the wurzite structure of the M-Si-Al-O-N polytypes. All of the polytype phases are found in the Si-Al-O-N-system in the quadrant which is characterised by high contents of Al and N, i.e. close to the AlN-corner. This is also the case in the M-Si-Al-O-N systems where substituted forms are found. All of the polytypes have extended solubility areas and can have varying Al/Si and O/N ratios which are changed with the sintering temperature. At very high temperatures the polytypes will form in the Al-O-N and the M-Al-O-N systems. The formed structure can be formed well-ordered under favourable conditions, but some structural disorder exists since the crystal structure of all polytypes is closely related to the wurzite structure. The phases can therefore not always unambiguously be characterized as only consisting of a certain polytype structure with X-ray diffraction, even if the presence of polytype can be detected.

5. YAG (Yttrium Aluminium Garnet) is a cubic phase with the formula $Y_3Al_5O_{12}$. Certain substitution of Al with Si and simultaneous replacement of O by N can appear. The structure can thereby be so distorted that the X-ray diffraction pattern corresponds to a phase of lower symmetry than the cubic such as e.g. b-phase. Similar metal aluminium garnets do also form with other sintering metals.

6. YAM (Yttrium Aluminium Melilite) is a monoclinic phase with the formula $Y_4Al_2O_9$ which can form a continuous series of solid solutions with N-YAM ($Y_4Si_2O_7N_2$).

7. In systems of the type M-Si-Al-O-N phases can appear which have the same crystal structure as the minerals apatite or wollastonite. One example for M=Y is a monoclinic phase with the formula $YSiO_2N$ of wollastonite type. Also other crystalline phases may appear, as the X-phase in the Si-Al-O-N system, or other types of crystal structures depending upon the metals used in the sintering aids.

8. Intergranular phase or phase mixture is formed during the sintering in M-Si-Al-O-N systems by the presence of a special sintering aid as $Al_2O_3$, $SiO_2$ and/or oxides, nitrides, or oxynitrides of M, where M=Y, Ca, Sc, Mg, Be, or the elements of the lanthanide series or mixtures of these. Other similar compounds of glass forming metals might also be used as sintering aids. The intergranular phase is liquid at the sintering. At the cooling at solidifies to a glass phase, but also other phases such as YAG etc described in item 5-7 above can thereby form. By heat treatment the main part of the liquid phase at the sintering can be transformed to the latter crystalline phases, whereby the fraction of glass phase will be low. These crystalline phase can be detected by X-ray diffraction.

We claim:

1. A sintered ceramic material based on silicon nitride, aluminum nitride and alumina consisting essentially of a combination of polytype of Si-Al-O-N and an alpha' phase of Si-Al-O-N and/or a beta' phase of Si-Al-O-N and an intergranular phase, the sintered material having in percent by volume: 1-70% polytype, 5-80% alpha' and/or beta' phase and 0.1-20% of the intergranular phase.

2. The sintered ceramic material of claim 1 wherein the sintered material contains at least 30 percent by volume alpha' phase and at the most 689% by volume beta' phase.

3. The sintered ceramic material of claim 1 wherein the sintered material contains at the most 50% by volume polytype.

4. The sintered ceramic material of claim 1 wherein the sintered material contains at the most 70 percent by volume of alpha'+beta' phase of Si-Al-O-N.

5. The sintered ceramic material of claim 1 further consisting essentially of at the most 20% by volume crystalline AlN.

6. The sintered ceramic material of claim 1 wherein the sintered material consists essentially of at least 40% by volume of polytype of Si-Al-O-N.

7. The sintered ceramic material of claim 1 wherein the sintered material consists essentially of at the most 60% by volume alpha'+beta' phase of Si-Al-O-N.

8. The sintered ceramic material of claim 1 wherein the sintered material consists essentially of at the most 15% by volume intergranular phase.

9. The sintered ceramic material of claim 1 wherein the sintered material consists essentially of at the most 10% by volume alpha'+beta' phase of Si-Al-O-N.

10. The sintered ceramic material of claim 1 wherein he sintered material consists essentially of a volume fraction polytype of Si-Al-O-N of at least 20%.

11. The sintered ceramic material of claim 1 further consisting essentially of a volume fraction of at the most 80% by volume crystalline AlN.

12. The sintered ceramic material of claim 1 wherein the sintered material contains a volume fraction of at the most 15% by volume of intergranular phase.

13. The sintered ceramic material of claim 1 further consisting essentially of greater than 5% by volume of silicon carbide.

14. The sintered ceramic material of claim 1 wherein the sintered ceramic material is coated with one or more wear resistant layers of nitrides, oxynitrides, oxides, borides, carbides, carbonitrides or oxycarbides of the transition elements from the groups III-VI and/or the elements aluminium.

15. A sintered ceramic material based on silicon nitride, aluminum nitride and alumina consisting essentially of a combination of polytype of Si-Al-O-N and an alpha' phase of Si-Al-O-N and/or a beta' phase of Si-Al-O-N and an intergranular phase, the sintered material having in percent by volume: 30-99% polytype of Si-Al-O-N, at the most 70% alpha' phase of Si-Al-O-N, at the most 70% beta' phase of Si-Al-O-N, at the most 30% crystalline AlN and 0.1-20% of the intergranular phase.

16. A sintered ceramic material based on silicon nitride, aluminum nitride and alumina consisting essentially of a combination of polytype of Si-Al-O-N and an alpha' phase of Si-Al-O-N and/or a beta' phase of Si-Al-O-N and an intergranular phase, the sintered material having in percent by volume: 5-99% of polytype of Si-Al-O-N, at the most 10% alpha' phase of Si-Al-O-N, at the most 95% crystalline AlN and 0.1-20% of the intergranular phase wherein the sum of the volume percentages is 100%.

17. A sintered ceramic material based on silicon nitride, aluminum nitride and alumina consisting essentially of a combination of polytype of Si-Al-O-N and an alpha' phase of Si-Al-O-N and/or a beta' phase of Si-Al-O-N, an intergranular phase and one or more refractory hard principal phases of nitrides, carbonitrides, carbides and/or oxynitrides of the transition elements from groups IV-VI and/or the elements aluminum, boron or silicon, the sintered material having in percent by volume: 1-70% polytype, 5-80% beta' phase and 0.1-20% of the intergranular phase.

18. A sintered ceramic material based on silicon nitride, aluminum nitride and alumina consisting essentially of a combination of polytype of Si-Al-O-N an alpha' phase of Si-Al-O-N and/or a beta' phase of Si-Al-O-N, an intergranular phase and 1-50% by volume of refractory, hard materials in a fibrous or whisker formed of SiC, TiN, $B_4C$, TiC, $Al_2O_3$ and/or $Si_2N_2O$, the fibers having a diameter less than 2 microns and a length/diameter-ratio of more than 10, the sintered material having in percent by volume: 1-70% polytype, 5-80% beta' phase and 0.1-20% of the intergranular phase.

19. A sintered ceramic material based on silicon nitride, aluminum nitride and alumina consisting essentially of a combination of polytype of Si-Al-O-N and an alpha' phase of Si-Al-O-N and/or a beta' phase of Si-Al-O-N, an intergranular phase and an additive selected froom SiC, TiN and TaN that improves the electrical conductivity of the sintered material so as to permit spark cutting, the sintered material having in percent by volume: 1-70% polytype, 5-80% alpha' and/or beta' phase and 0.1-20% of the intergranular phase.

* * * * *

UNITED STATES PATENT AND TRADEMARK OFFICE
CERTIFICATE OF CORRECTION

PATENT NO. : 4,818,635

DATED : April 4, 1989

INVENTOR(S) : Thommy C. Ekström et al

It is certified that error appears in the above-identified patent and that said Letters Patent is hereby corrected as shown below:

Column 1, line 53, after "Si-Al-O-N" insert -- and --;

line 61, "Si-Al-On-N" should read -- Si-Al-O-N --;

Column 2, line 12, "Si-Al-On" should read -- Si-Al-O-N --;

Column 3, line 17, "akluminium" should read -- aluminium --;

Column 6, lines 14-15, "Al-$_2$O$_3$" should read -- Al$_2$O$_3$ --;

Column 7, line 2, "Vvapour" should read -- Vapour --;

Column 10, approx. line 16, across from Material 12, under the column
    Al$_2$O$_3$, "--" should read -- 40 --;

Column 11, line 15, "Tthe" should read -- The --;

line 32, "SsNGN" should read -- SNGN --;

line 64, "at" should read -- At --;

Column 12, line 42, "120800 e" should read -- 120800 E --;

line 67, "Materil" should read -- Material --;

Column 13, line 23, "0.2°x10°" should read -- 0.20x20° --;

line 41, "120416t" should read -- 120416T --;

Column 14, line 31, "300-600-800 m/min" should read -- 400-600-800 m/min --;

line 61, "SsNGN" should read -- SNGN --;

line 62, "0.20°x20°" should read -- 0.20x20° --;

Column 15, line 23, "0.20°x20°" should read -- 0.20x20° --;

UNITED STATES PATENT AND TRADEMARK OFFICE
CERTIFICATE OF CORRECTION

PATENT NO. : 4,818,635

DATED : April 4, 1989

INVENTOR(S) : Thommy C. Ekström et al

It is certified that error appears in the above-identified patent and that said Letters Patent is hereby corrected as shown below:

Column 17, line 24, "at" should read -- it --;

line 43, "689%" should read -- 68.9% --;

Column 18, line 15, "elements" should read -- element --; and line 63, "froom" should read -- from --.

Signed and Sealed this

Twenty-first Day of August, 1990

Attest:

HARRY F. MANBECK, JR.

Attesting Officer        Commissioner of Patents and Trademarks